Sept. 8, 1970  A. N. EDE  3,526,980

PIPE-LAYING APPARATUS INCLUDING A MOLE PLOUGH

Filed March 8, 1968  2 Sheets-Sheet 1

Inventor
AINSLEY N. EDE
By
Attorney

Sept. 8, 1970 A. N. EDE 3,526,980
PIPE-LAYING APPARATUS INCLUDING A MOLE PLOUGH
Filed March 8, 1968 2 Sheets-Sheet 2

Inventor
AINSLEY N. EDE
By
*(signature)*
Attorney

United States Patent Office 3,526,980
Patented Sept. 8, 1970

---

3,526,980
PIPE-LAYING APPARATUS INCLUDING A MOLE PLOUGH
Ainsley Neville Ede, 36 Thornton Way,
Cambridge, England
Filed Mar. 8, 1968, Ser. No. 711,804
Claims priority, application Great Britain, Mar. 10, 1967, 11,286/67
Int. Cl. E02f *5/18, 5/06*
U.S. Cl. 37—193                        6 Claims

ABSTRACT OF THE DISCLOSURE

Mole plough apparatus comprises a mole plough dragged behind a vehicle and attached to a frame which is pivotal about a horizontal axis on and in front of the vehicle, a horizontal force being applied to the vehicle to draw it along, at a point below the axis. Thus the couple created by this force and the horizontal component of the drag on the mole plough, which tends to raise the front of the vehicle, is opposed by the couple created by the vertical component of the drag and the weight of the apparatus.

---

The invention relates to mole plough apparatus for producing below-ground passages as used, for example, in pipe-laying and similar operations.

Embodiments of the invention can be constructed which are of compact overall size and which reduce a tendency of the mole plough element to rise in use, which tendency may arise in other mole plough apparatus.

According to the invention there is provided mole plough apparatus, comprising a mole plough element attached by a supporting member to a vehicle and by means of which the the mole plough element is dragged through the ground as the vehicle moves in a forward direction, the supporting member being attached to the vehicle by a pivotal attachment permitting the member to pivot about a horizontal axis which is forward of the vehicle and transverse to the said forward direction, and means for applying a horizontal force to the vehicle to move it in the forward direction, the force being applied in such a position that it, and the horizontal component of the drag on the mole plough element acting through the pivotal attachment, create a couple tending to raise the leading end of the vehicle, the said couple being opposed by a couple created by the vertical component of the drag and the reaction to the weight of the apparatus and the vertical component of the drag.

According to the invention there is also provided mole plough apparatus, comprising a mole plough element attached by a first supporting member to a vehicle and by means of which the mole plough element is dragged through the ground as the vehicle moves in a forward direction, a second supporting member attached to the vehicle so as to extend forwardly thereof and so as to be rigid with the vehicle as regards any axis transverse to the vehicle, the first supporting member being attached to the vehicle by a pivotal attachment on the second supporting member permitting the first supporting member to pivot about a horizontal axis which is forward of the vehicle and transverse to the vehicle, the second supporting member supporting force application means below the said pivotal attachment and by means of which a horizontal force can be appiled to the vehicle to move it in the forward direction, the vertical distance between the force application means and the pivotal attachment being so related to the horizontal distance between the centre of support of the apparatus by the ground and the pivotal attachment that the couple created by the said horizontal force and the horizontal component of the drag on the mole plough element substantially balances the couple created by the vertical component of the drag and the reaction to the weight of the apparatus and the vertical component of the drag.

Figure 1:
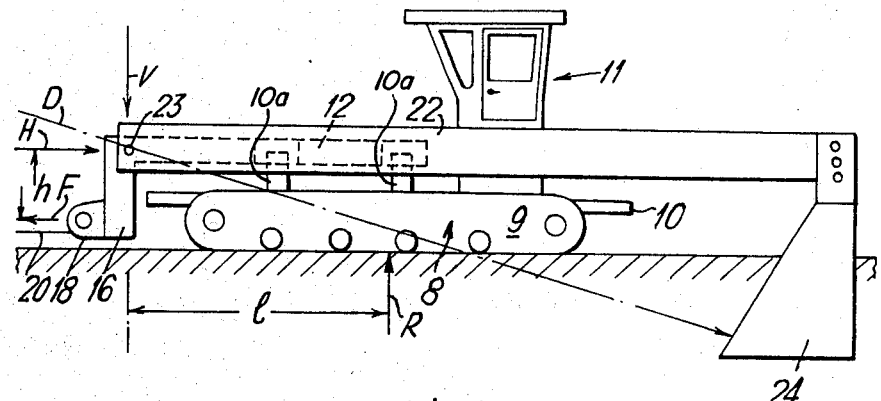
Figure 2:
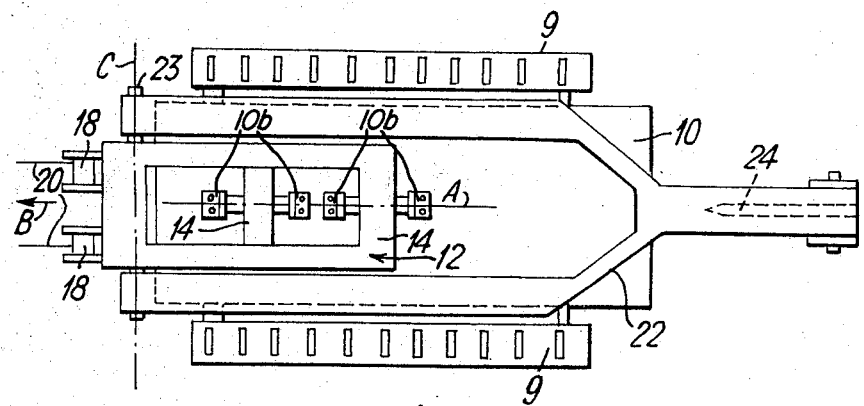
Figure 3:
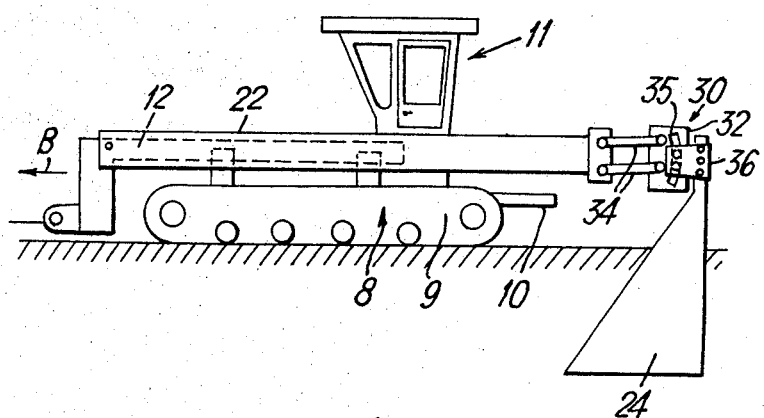

Mole plough apparatus embodying the invention will now be described by way of example and with reference to the accompanying drawings in which:

FIG. 1 is a diagrammatic side elevation of the apparatus illustrating the distribution of forces;
FIG. 2 is a plan view of the apparatus of FIG. 1; and
FIG. 3 is a diagrammatic side elevation of a modified form of the apparatus of FIGS. 1 and 2.

Referring firstly to FIGS. 1 and 2, the apparatus comprises a tracked vehicle 8 having tracks 9, a platform 10 and an operator's cabin 11 (the latter omitted from FIG. 2), all illustrated somewhat diagrammatically. The platform 10 supports an inner frame 12. The frame 12 has two cross members 14 respectively pivotally supported on the upper ends of upstanding supports 10a secured to the platform 10 by brackets 10b. In this way the frame is attached to the vehicle so as to be pivotable about the fore and aft axis A of the vehicle. The frame 12 has a downwardly depending leg 16 which supports two winches 18. Cables 20 engage the winches, and by means of the cables a horizontal force can be applied to draw The apparatus also comprises an outer frame 22 which is pivoted to the inner frame 12 at an attachment 23 so as to be pivotable about an axis C perpendicular to the axis A. The frame 22 supports the mole plough element 24 at its distal end, the element 24 being shown in the form of a blade having a V-form leading edge, though it may take any other suitable form.

In use, the vehicle is drawn in the direction of the arrow B and the blade 24 is dragged through the ground to form a slit trench for pipe-laying purposes. As the outer frame and the blade are attached to the vehicle at the attachment 23 only, the drag D on the blade 24 acts through this attachment as shown in FIG. 1 and can be resolved into horizontal and vertical components H and V. The other forces acting on the vehicle are the force F exerted by the cable 20 and the weight of the apparatus which together with V generates the reaction R acting through the centre of pressure or support. It will be seen that the forces F and H produce a couple having an arm *h*, which, because the pivotal attachment 23 is forward of the vehicle, tends to raise the front of the vehicle. The forces V and R, however, produce a couple, having an arm *l* which tends to lower the front of the vehicle. The distances *h* and *l* are arranged to be such that the couples substantially balance each other. In practice, the distance *h* can be made adjustable to maintain this balance under varying soil and other conditions.

The arrangement described, by pivoting the mole blade in front of the vehicle, enables the supporting frame 22 for the blade to be desirably long (so as to smooth the channel formed and to oppose the tendency for the blade to rise in operation) yet at the same time enables the overall length to be relatively short for ease of carriage and maneuvering.

The vehicle 8 may conveniently be a self-powered tractor so as to be able to transport the blade 24, when the latter has been raised clear of the ground by means not shown, and in that case the front end of the vehicle when moving in the direction of the arrow B may be the rear end of the tractor.

In a modification shown in FIG. 3, the blade 24 is not directly attached to the outer frame 22 but is attached thereto by means of a roller frame assembly 30 which permits the mole blade to operate in controlled floating equilibrium. The roller frame assembly 30 is substantially similar to that described in United Kingdom patent specification No. 851,746. It comprises a roller track plate 32 which is attached to a plate 33, rigid with the frame 22, by two parallel arms 34 pivoted at each end. The plate 32 provides an arcuate slot 35 in which run two rollers (shown dotted) which are rotatably mounted on a plate 36 which is rigid with the blade 24.

What is claimed is:

1. Mole plough apparatus, comprising a ground-engaging vehicle, supporting means, a pivotal attachment attaching the supporting means to the vehicle so that the supporting means is pivotable about a horizontal axis which is forward of the vehicle and transverse to the forward direction of the vehicle, a mole plough element, means attaching the mole plough element to the supporting means rearwardly of the vehicle whereby the mole plough element is dragged through the ground as the vehicle moves in the forward direction, force application means supported on the vehicle and by means of which a horizontal force can be applied to the vehicle to move it in the forward direction, further supporting means, and means attaching the further supporting means to the vehicle so as to be rigid therewith as regards any axis transverse to the vehicle, the said pivoted attachment of the first mentioned supporting means comprising a pivotal attachment on the further supporting means, and the further supporting means extending forwardly of the vehicle and supporting the force-application means below the pivotal attachment whereby the force and the horizontal component of the drag on the mole plough element acting through the pivotal attachment, create a couple tending to raise the forward end of the vehicle, the said couple being opposed by a couple created by the vertical component of the drag and the reaction to the weight of the apparatus and the vertical component of the drag.

2. Apparatus according to claim 1 wherein the vertical distance between the force-application means and the pivotal attachment is so related to the horizontal distance between the centre of support of the apparatus by the ground and the pivotal attachment that the two said couples substantially balance each other.

3. Apparatus according to claim 2, in which the means attaching the further supporting means to the vehicle comprises means permitting the further supporting means to pivot about an axis extending fore and aft of the vehicle.

4. Apparatus according to claim 2, in which the force-application means comprises a winch adapted to receive a cable.

5. Apparatus according to claim 1, in which the means attaching the mole plough element to the supporting means comprises linkage permitting the mole plough element to move controllably up and down relative to the supporting means.

6. Apparatus according to claim 1, in which the vehicle has ground-engaging tracks.

References Cited

UNITED STATES PATENTS

| | | | |
|---|---|---|---|
| 2,494,069 | 1/1950 | Steffen | 37—94 |
| 2,638,832 | 5/1953 | Kinsinger | 37—193 |
| 3,286,476 | 11/1966 | Maclay | 37—193 |
| 3,032,903 | 5/1962 | Ede | 37—193 |
| 3,140,745 | 7/1964 | Hinkle et al. | 172—292 |

FOREIGN PATENTS

| | | |
|---|---|---|
| 1,185,238 | 7/1959 | France. |

ROBERT E. PULFREY, Primary Examiner

E. H. EICHOLT, Assistant Examiner

U.S. Cl. X.R.

61—72.1; 172—23